United States Patent
Hamashima

(10) Patent No.: US 8,277,099 B2
(45) Date of Patent: Oct. 2, 2012

(54) VEHICLE LIGHTING SYSTEM

(75) Inventor: Yoshihiko Hamashima, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 223 days.

(21) Appl. No.: 12/689,779

(22) Filed: Jan. 19, 2010

(65) Prior Publication Data

US 2010/0208483 A1  Aug. 19, 2010

(30) Foreign Application Priority Data

Feb. 13, 2009 (JP) ................... 2009-031487

(51) Int. Cl.
*F21V 19/02* (2006.01)
*F21V 21/30* (2006.01)
*B60Q 1/00* (2006.01)

(52) U.S. Cl. ......... 362/528; 362/530; 362/545; 362/547
(58) Field of Classification Search .......... 362/523, 362/528, 529, 530, 531, 532, 545, 547
See application file for complete search history.

(56) References Cited

U.S. PATENT DOCUMENTS

| | | | | |
|---|---|---|---|---|
| 4,318,161 A | * | 3/1982 | Shanks | 362/656 |
| 4,318,162 A | * | 3/1982 | Sip | 362/656 |
| 4,870,544 A | * | 9/1989 | Iwamoto | 362/528 |
| 5,908,239 A | * | 6/1999 | Sugimoto | 362/528 |
| 7,008,135 B2 | * | 3/2006 | Wisler et al. | 403/122 |
| 7,114,837 B2 | | 10/2006 | Yagi et al. | |
| 7,316,495 B2 | * | 1/2008 | Watanabe et al. | 362/545 |
| 7,566,153 B2 | * | 7/2009 | Nagashima et al. | 362/512 |
| 7,758,218 B2 | * | 7/2010 | Mochizuki et al. | 362/465 |
| 7,931,395 B2 | * | 4/2011 | Kim | 362/523 |
| 7,985,013 B2 | * | 7/2011 | Yasuda | 362/547 |
| 2004/0202007 A1 | | 10/2004 | Yagi et al. | |
| 2009/0154190 A1 | * | 6/2009 | Choi et al. | 362/549 |

FOREIGN PATENT DOCUMENTS

JP  2004-311224 A  11/2004

* cited by examiner

*Primary Examiner* — David Crowe
(74) *Attorney, Agent, or Firm* — Foley & Lardner LLP

(57) ABSTRACT

A vehicle lighting system according to the present invention is provided, and includes: a pivot portion for optical axis adjustment; an optical axis adjustment mechanism mounting portion for vertical direction; and an optical axis adjustment mounting portion for horizontal direction, which are integrally provided at a heat sink member having a semiconductor-type light source mounted thereon. As a result, the vehicle lighting system becomes capable of efficiently radiating a heat generated in the semiconductor-type light source by means of the pivot portion for optical axis adjustment and the optical axis adjustment mechanism mounting portions for vertical and horizontal directions, which are integrally provided at the heat sink member.

10 Claims, 12 Drawing Sheets

VEHICLE LIGHTING SYSTEM

CROSS-REFERENCE TO RELATED APPLICATIONS

This application claims priority of Japanese Patent Application No. 2009-31487 filed on Feb. 13, 2009. The contents of this application are incorporated herein by reference in their entirety.

BACKGROUND OF THE INVENTION

1. Field of the Invention

The present invention relates to a vehicle lighting system using a semiconductor-type light source such as an LED, for example, as a light source. In particular, the present invention relates to a vehicle lighting system which is provided with an optical axis adjuster.

2. Description of the Related Art

A vehicle lighting system of this type is conventionally known (Japanese Laid-open Patent Application No. 2004-311224, for example). Hereinafter, the conventional vehicle lighting system will be described. In the conventional vehicle lighting system, a plurality of lamp units with light emitting diodes employed as light sources are supported by a common metallic support member, and the metallic support member is supported so as to be inclinable to a lamp body in a vertical direction and a horizontal direction via three aiming screws and three aiming nuts. By rotating the three aiming screws to advance or retract the three aiming nuts, optical axes of the plurality of lamp unit are adjusted via the metallic support member.

In the above-described conventional vehicle lighting system, it has been important to efficiently radiate a heat generated in the light emitting diode as a light source.

The present invention has been made in view of the above-described importance, and aims to provide a vehicle lighting system which is capable of efficiently radiating a heat generated in a semiconductor-type light source (light emitting diode) as a light source, and moreover, which is capable of adjusting an optical axis of the semiconductor-type light source as a light source via a heat sink member having the semiconductor-type light source mounted thereon as a light source.

SUMMARY OF THE INVENTION

A first aspect of the present invention is directed to a vehicle lighting system, comprising:
(i) a heat sink member;
(ii) a semiconductor-type light source which is mounted on the heat sink member; and
(iii) a pivot portion for optical axis adjustment, an optical axis adjustment mechanism mounting portion for vertical direction, and an optical axis adjustment mechanism mounting portion for horizontal direction, which are integrally provided at the heat sink member.

A second aspect of the present invention is directed to the vehicle lighting system using the semiconductor-type light source, according to the first aspect, wherein:
the pivot portion for optical axis adjustment is positioned in proximity to a gravity of a respective one of the heat sink member, the pivot portion for optical axis adjustment, the optical axis adjustment mechanism mounting portion for vertical direction, and the optical axis adjustment mechanism mounting portion for horizontal direction; and the optical axis adjustment mechanism mounting portion for vertical direction and the optical axis adjustment mechanism mounting portion for horizontal direction are positioned opposite to each other with the pivot portion for optical axis adjustment being sandwiched therebetween.

A third aspect of the present invention is directed to the vehicle lighting system according to the first aspect, wherein:
the pivot portion for optical axis adjustment is provided along a parting line of a die for molding the heat sink member, the pivot portion for optical axis adjustment, the optical axis adjustment mechanism mounting portion for vertical direction, and the optical axis adjustment mechanism mounting portion for horizontal direction; and
a heat radiation fin is provided vertical to the parting line and integrally in two directions, at the heat sink member.

A fourth aspect of the present invention is directed to a vehicle lighting system which is disposed in a lamp room partitioned by a lamp housing and a lens, the system comprising:
(i) a lamp unit including a semiconductor-type light source;
(ii) a heat sink member having the lamp unit mounted thereon, for radiating a heat generated from the semiconductor-type light source;
(iii) a pivot portion which is provided on a side face of the heat sink member, for rotatably mounting the heat sink member on the lamp housing; and
(iv) an optical axis adjustment mechanism, which is provided at a predetermined position of a foreface of the heat sink member, the adjustment mechanism rotating via the pivot portion to thereby adjust an optical axis of light illuminated from the lamp unit, wherein:
the pivot portion and the optical axis adjustment mechanism are formed integrally with each other relative to the heat sink member so as to improve heat radiation efficiency of the heat sink member.

A fifth aspect of the present invention is directed to the vehicle lighting system according to the fourth aspect, wherein:
the optical axis adjustment mechanism includes:
a first optical axis adjustment mechanism for adjusting the optical axis in a first direction; and
a second optical axis adjustment mechanism for adjusting the optical axis in a second direction which is different from the first direction, and
the pivot portion, the first optical axis adjustment mechanism, and the second optical axis adjustment mechanism are formed integrally with each other relative to the heat sink member so as to be disposed at three corners forming a predetermined triangle of the heat sink member in a case where the heat sink member is seen in a plan view, a front view, and a side view.

A sixth aspect of the present invention is directed to the vehicle lighting system according to the forth aspect, wherein:
the optical axis adjustment mechanism includes:
the first optical axis adjustment mechanism for adjusting the optical axis in a first direction; and
the second optical axis adjustment mechanism for adjusting the optical axis in a second direction which is different from the first direction, and
the first optical axis adjustment mechanism and the second optical axis adjustment mechanism are formed integrally with each other at the left and right of the foreface of the heat sink member so as to sandwich the pivot portion that is provided on a side face of the heat sink member therebetween, in a case where the heat sink member is seen in a plan view.

A seventh aspect of the present invention is directed to the vehicle lighting system according to the forth aspect, wherein:

the pivot portion and the optical axis adjustment mechanisms are integrally molded with the heat sink member in a die for molding the heat sink member.

An eighth aspect of the present invention is directed to the vehicle lighting system according to the forth aspect, wherein:

the heat sink member includes:
a first heat radiation fin which is disposed at a foreside of the heat sink member; and
a second heat radiation fin which is disposed at a backside of the heat sink member, and
the first heat radiation fin and the second heat radiation fin are formed integrally with each other relative to the heat sink member together with the pivot portion and the optical axis adjustment mechanisms in the die for molding the heat sink member.

A ninth aspect of the present invention is directed to a vehicle lighting system which is disposed in a lamp room partitioned by a lamp housing and a lens, the system comprising:

(i) a lamp unit including a semiconductor-type light source;
(ii) a heat sink member having the lamp unit mounted thereon, for radiating a heat generated from the semiconductor-type light source;
(iii) a pivot portion which is provided on a side face of the heat sink member, for rotatably mounting the heat sink member on the lamp housing; and
(iv) an optical axis adjustment mechanism, which is provided at a predetermined position of a foreface of the heat sink member, the adjustment mechanism rotating via the pivot portion to thereby adjust an optical axis of light illuminated from the lamp unit, wherein:

the optical axis adjustment mechanism includes:
a first optical axis adjustment mechanism for adjusting the optical axis in a first direction; and
a second optical axis adjustment mechanism for adjusting the optical axis in a second direction which is different from the first direction, and
the pivot portion, the first optical axis adjustment mechanism, and the second optical axis adjustment mechanism are formed integrally with each other relative to the heat sink member so as to be disposed at three corners forming a predetermined triangle of the heat sink member, in a case where the heat sink member is seen in a plan view, a front view, and a side view.

A tenth aspect of the present invention is directed to the vehicle lighting system according to the ninth aspect, wherein:

the first optical axis adjustment mechanism and the second optical axis adjustment mechanism are formed integrally with each other at the left and right of the foreface of the heat sink member so as to sandwich the pivot portion that is provided on a side face of the heat sink member therebetween, in a case where the heat sink member is seen in a plan view.

An eleventh aspect of the present invention is directed to the vehicle lighting system according to the ninth aspect, wherein:

the pivot portion, the first optical axis adjustment mechanism, and the second optical axis adjustment mechanism are integrally molded with the heat sink member in a die for molding the heat sink member.

A twelfth aspect of the present invention is directed to the vehicle lighting system according to the ninth aspect, wherein:

the heat sink member includes:
a first heat radiation fin which is disposed at a foreside of the heat sink member; and
a second heat radiation fin which is disposed at a backside of the heat sink member, and
the first heat radiation fin and the second heat radiation fin are formed integrally with each other relative to the heat sink member together with the pivot portion and the optical axis adjustment mechanisms in the die for molding the heat sink member.

The vehicle lighting system according to the first aspect allows a heat radiation area to increase due to a pivot portion for light axis adjustment, an optical axis adjustment mechanism mounting portion for vertical direction, and an optical axis adjustment mounting portion for horizontal direction, which are integrally provided at the heat sink member, so that a heat generated in a semiconductor-type light source mounted on the heat sink member can be efficiently radiated together with that of the heat sink member. In other words, heat radiation efficiency is improved.

In addition, the vehicle lighting system according to the first aspect allows a pivot portion for optical axis adjustment to be mounted on a lamp housing via a pivot receptacle member and allows the optical axis adjustment mechanisms for vertical and horizontal directions to be mounted between optical axis adjustment mechanism mounting portions for vertical and horizontal directions and the lamp housing, whereby an optical axis of the semiconductor-type light source can be adjusted in a vertical direction and in a horizontal direction via the heat sink member, the pivot portion for optical axis adjustment, and the optical axis adjustment mechanism mounting portions for vertical and horizontal directions, which are structured integrally with each other.

The vehicle lighting system according to the second aspect allows durability relatively a vehicle vibration to be improved by the means for solving the problem described previously.

The vehicle lighting system according to the third aspect allows a heat sink member at which the pivot portion for optical axis adjustment and the heat radiation fin in two directions relative to the pivot portion for optical axis adjustment to be die-molded by the means for solving the problem described previously. Moreover, a pivot portion for optical axis adjustment and a heat radiation fin in two directions relative to the pivot portion for optical axis adjustment are provided integrally each other at the heat sink member; and therefore, heat radiation efficiency is further improved.

DESCRIPTION OF THE PREFERRED EMBODIMENTS

Figure 1:
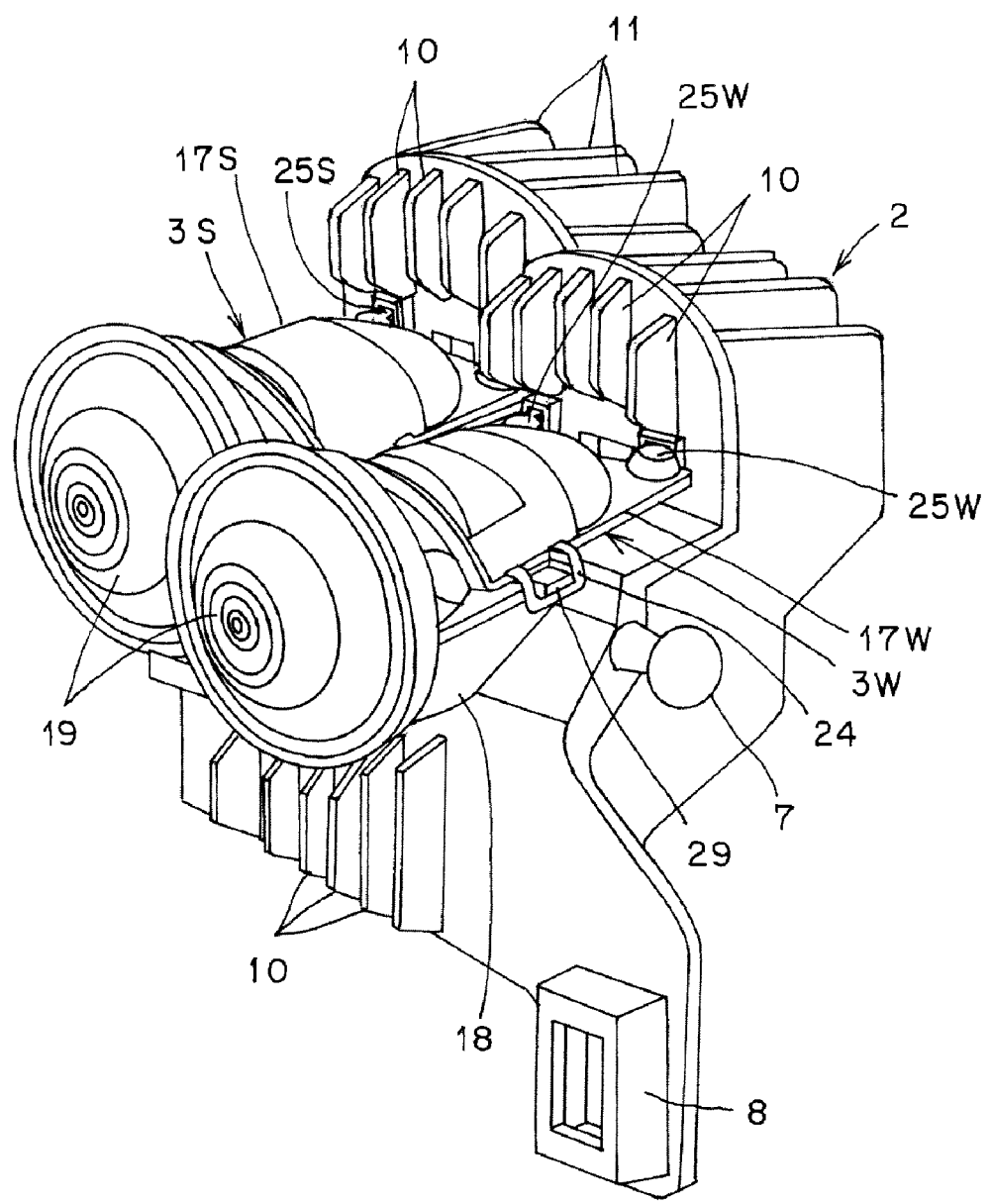
FIG. 1 is a perspective view of assembling a heat sink member and two lamp units, showing an embodiment of a vehicle lighting system according to the present invention.
Figure 2:
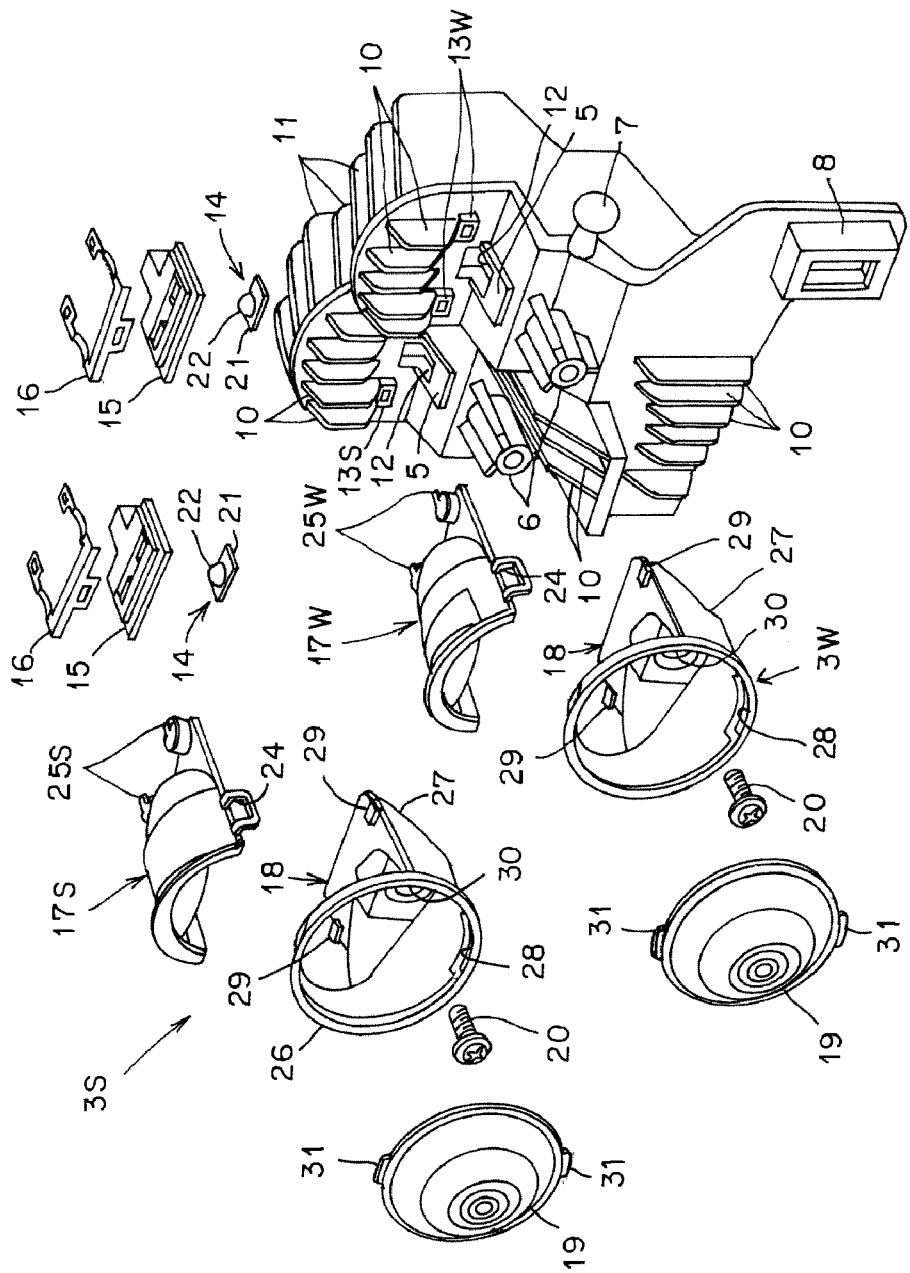
FIG. 2 is an exploded perspective view showing the heat sink member and the two lamp units.
Figure 3:
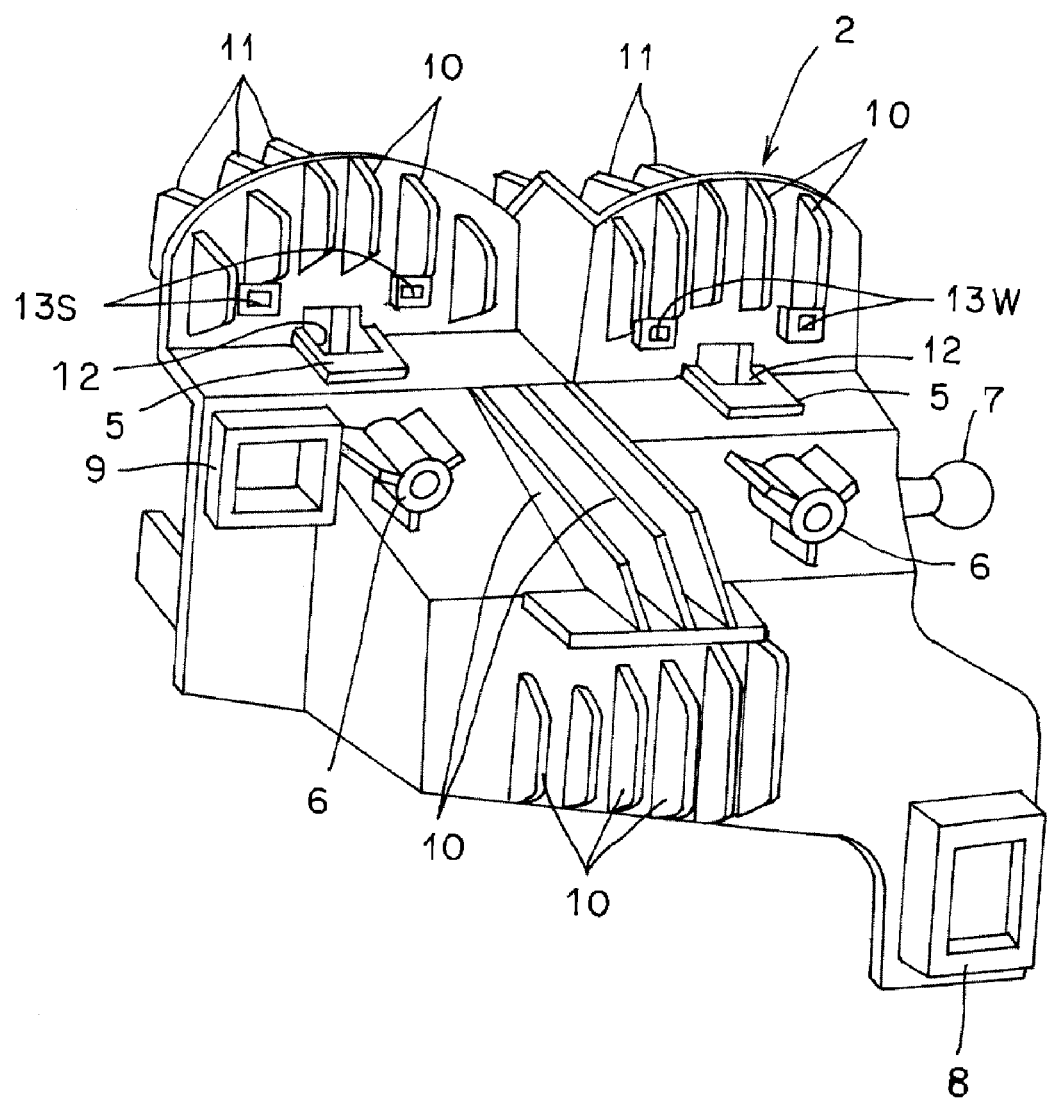
FIG. 3 is a perspective view showing the heat sink member.

Hereinafter, a constitution of a vehicle lighting system of the embodiment will be described.

In the drawings, reference numeral 1 designates a vehicle lighting system of the embodiment. The vehicle lighting system 1 is a vehicle headlamp such as a headlamp. The vehicle lighting system 1 is provided with: a heat sink member 2; a plurality of lamp units (two lamp units in the embodiment, namely one lamp unit 3S of focusing type and one lamp unit 3W of diffusion type); a lamp housing 4; and a lamp lens (such as a transparent outer lens, for example), although not shown.

The two lamp units 3S, 3W are mounted on the heat sink member 2. The heat sink member 2 and the two lamp units 3S, 3W are disposed to be adjustable along an optical axis in a lamp room (not shown) which is partitioned by the lamp housing 4 and the lamp lens.

The heat sink member 2 is made of a material with its high thermal conductivity, such as a resin or a metallic die cast (aluminum die cast in the embodiment). The heat sink member 2 also functions as a mount bracket. The heat sink member 2 is shaped stepwise when it is seen in a side view, and is formed in a shape such that a left side portion and a right side portion are displaced forward/backward when it is seen in a plan view.

At the heat sink member 2, there are integrally provided: two placement portions 5 for placing semiconductor-type light sources; two mounting boss portions 6 for lamp unit mounting; a pivot portion 7 for optical axis adjustment (hereinafter, simply referred to as a "pivot portion"); an optical axis adjustment mechanism mounting portion 8 for vertical direction (hereinafter, simply referred to as a "vertical mount portion"); and an optical axis adjustment mechanism mounting portion 9 for horizontal direction (hereinafter, simply referred to as a "horizontal mounting portion"); a foreside heat radiation fin 10; a backside heat radiation fin 11, respectively.

The two placement portions 5 are integrally provided at a horizontal part of a left-side and at a horizontal part of a right-side portion, of the heat sink member 2, respectively.

The two mounting boss portions 6 are integrally provided at an inclined part of the right side portion and at an inclined portion of a left side portion, of the heat sink member 2, respectively. The pivot portion 7 is provided laterally integrally from an end face of the inclined part of the left side portion of the heat sink member 2. The vertical mount portion 8 is integrally provided at a lower end of a lower vertical part of the left side portion of the heat sink member 2. The horizontal mount portion 9 is integrally provided at an upper end of the lower vertical part of the right side portion of the heat sink member 2. The foreside heat radiation fin 10 is integrally provided in plurality on a foreface of a respective one of the upper vertical part, the inclined part, and the lower vertical part, of the heat sink member 2, in a vertical direction (longitudinal direction, upward-downward direction). The backside heat radiation fin 11 is integrally provided in plurality on a back face of a respective one of the upper vertical part, the inclined part, and the lower vertical part, of the heat sink member 2, in a vertical direction (longitudinal direction, upward-downward direction).

The pivot portion 7 is positioned in proximity to a gravity in the forward/backward directions of the heat sink member 2 and the portions 5, 6, 7, 8, 9, 10, 11. The vertical mounting portion 8 and the horizontal mounting portion 9 are positioned in opposite to each other in the forward/backward directions while the pivot portion 7 is sandwiched therebetween.

Figure 4:
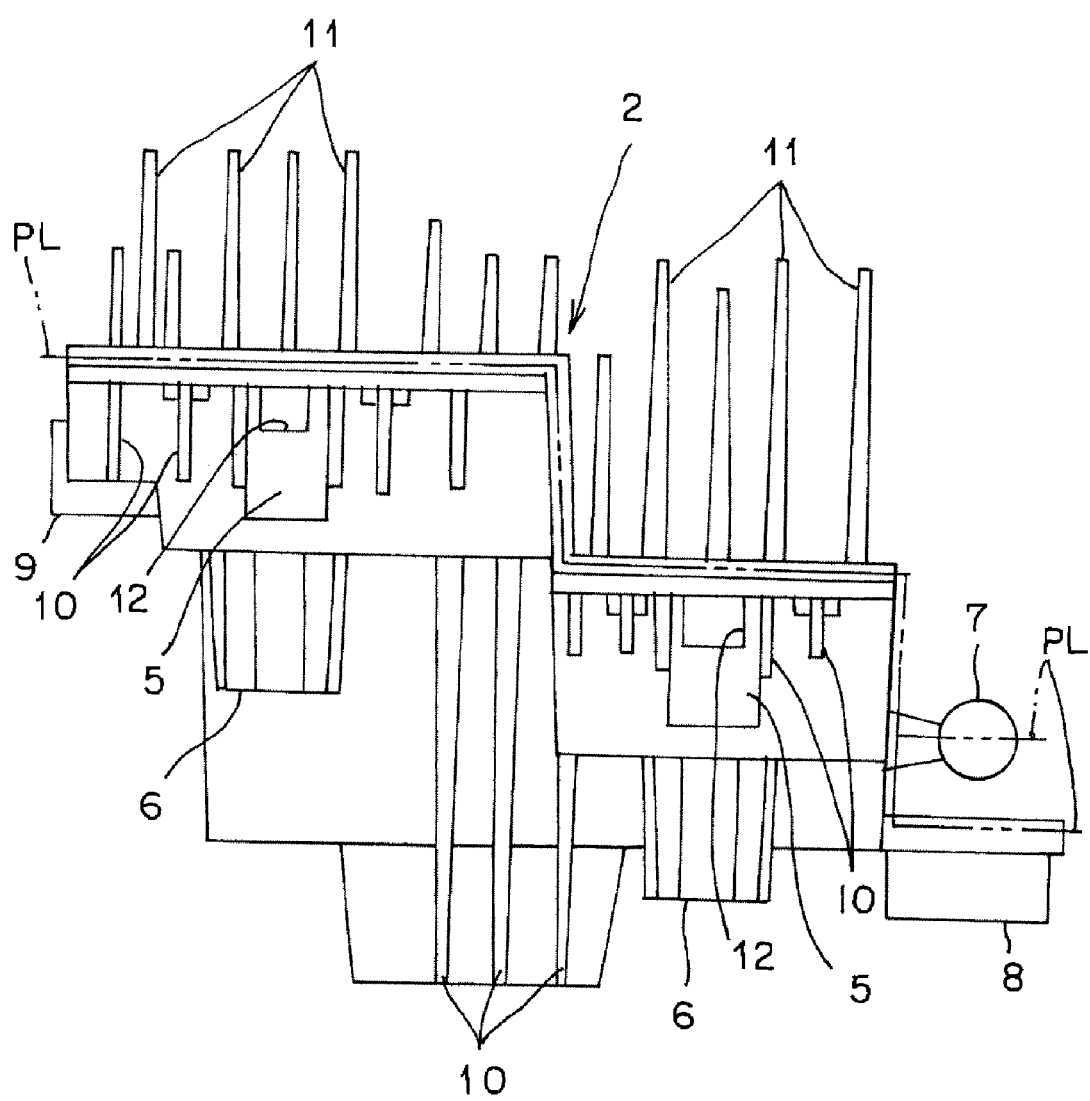
FIG. 4 is a plan view showing the heat sink member.

The pivot portion 7 is provided along a parting line PL (the double-dotted chain line of FIG. 4) of a die (not shown) for molding the heat sink member 2 and the portions 5, 6, 7, 8, 9, 10, 11. At the heat sink member 2, the foreside heat radiation fin 10 and the backside heat radiation fin 11 are integrally provided to be vertical (substantially vertical) to the parting line PL and in two directions, namely in the forward/backward directions. The parting line PL in the pivot portion 7, which is positioned at an upper part, and the parting line PL in the vertical mounting portion 8, which is positioned at a lower part, are interchangeable forward and backward.

Figure 7:
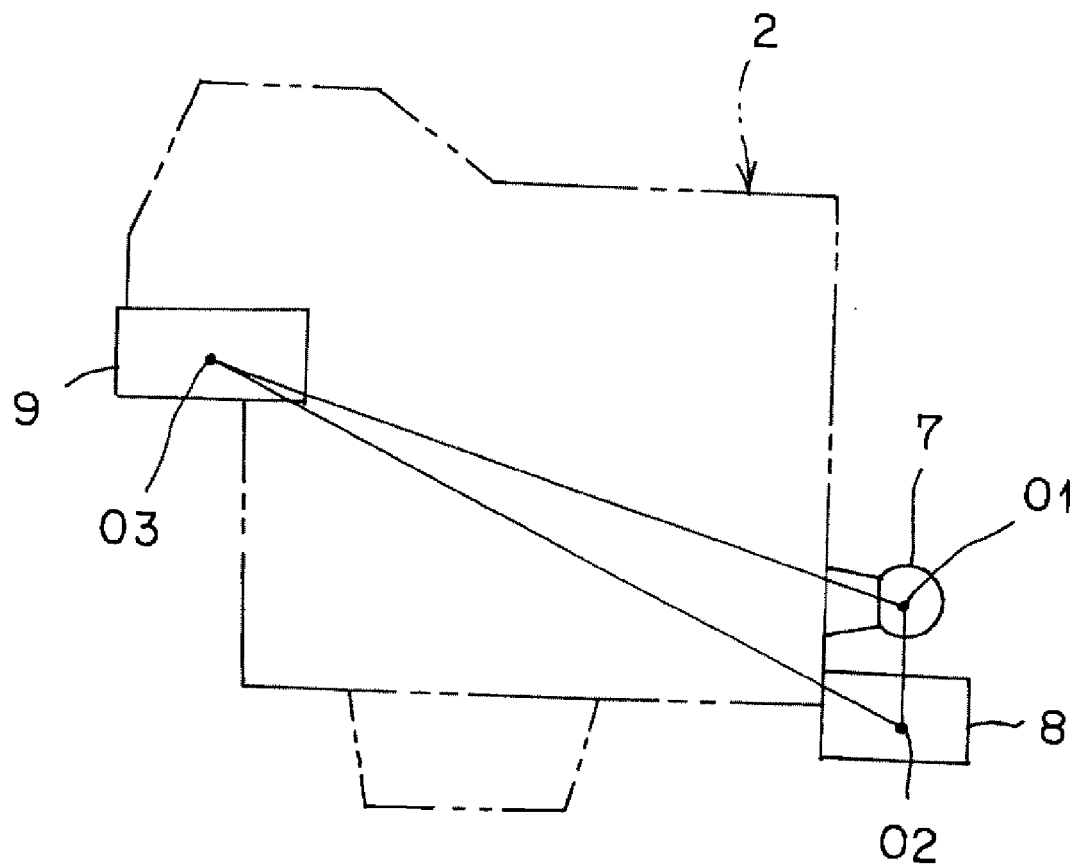
FIG. 7 is an explanatory plan view showing a relative position relationship of a pivot portion for optical axis adjustment; an optical axis adjustment mechanism mounting portion for vertical direction; and an optical axis adjustment mechanism mounting portion for horizontal direction, which are integrally provided at the heat sink member.
Figure 8:
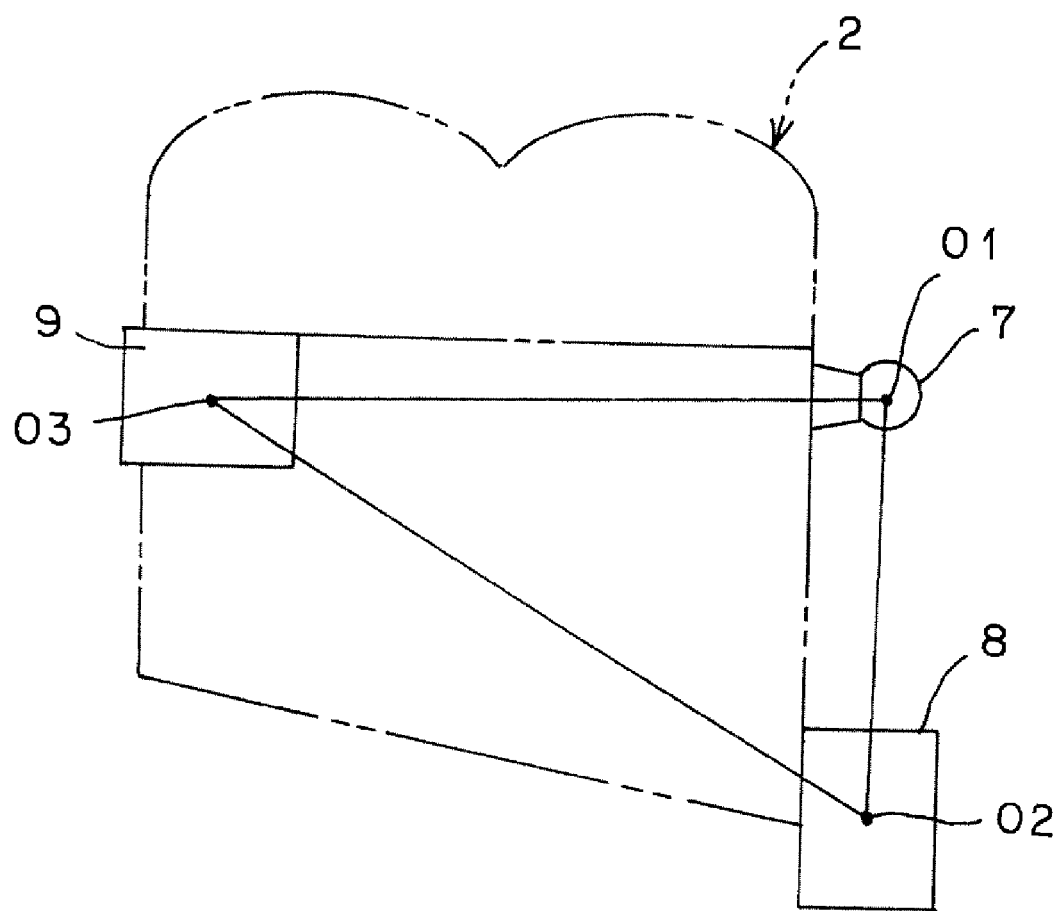
FIG. 8 is an explanatory front view showing a relative position relationship of the pivot portion for optical axis adjustment, which is integrally provided at the heat sink member; the optical axis adjustment mechanism mounting portion for vertical direction; and the optical axis adjustment mechanism mounting portion for horizontal direction.
Figure 9:
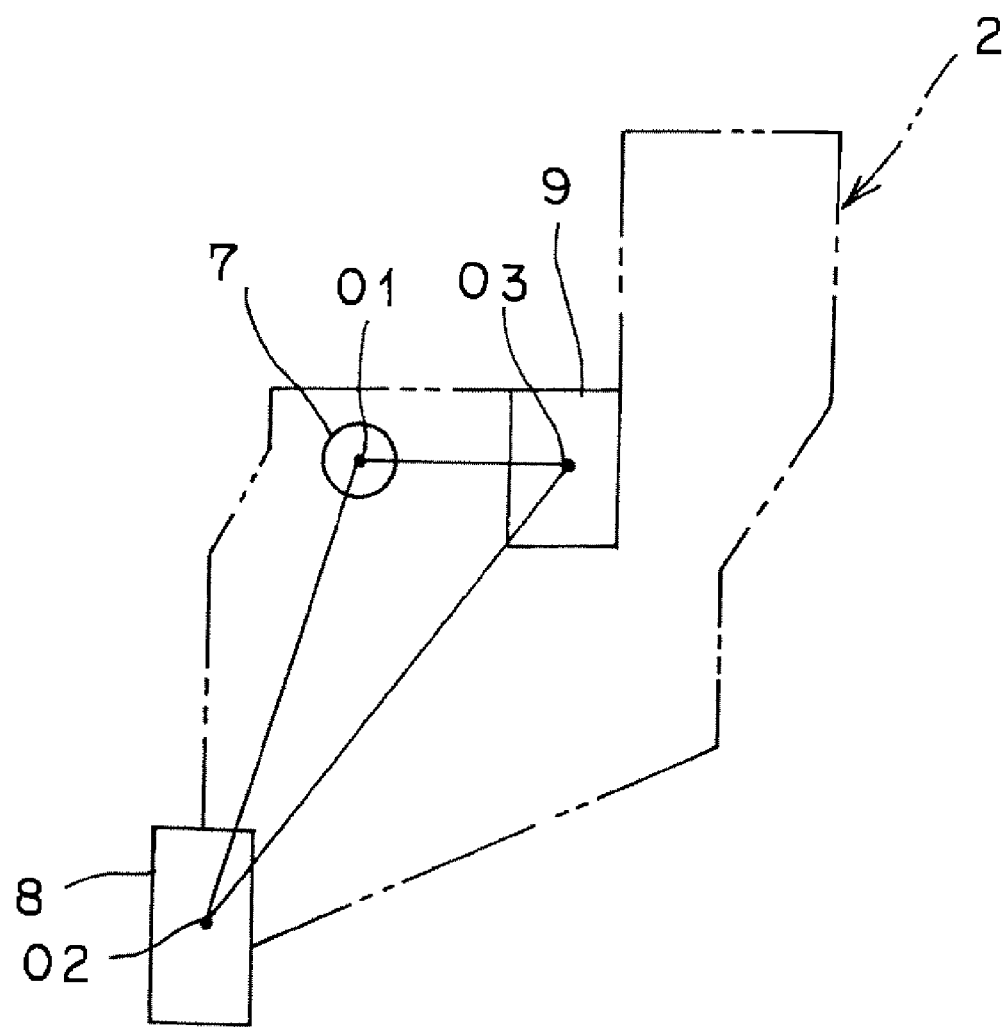
FIG. 9 is an explanatory side view showing a relative position relationship of the pivot portion for optical axis adjustment; the optical axis adjustment mechanism mounting portion for vertical direction; and the optical axis adjustment mechanism mounting portion for horizontal direction, which are integrally provided at the heat sink member.
Figure 10:
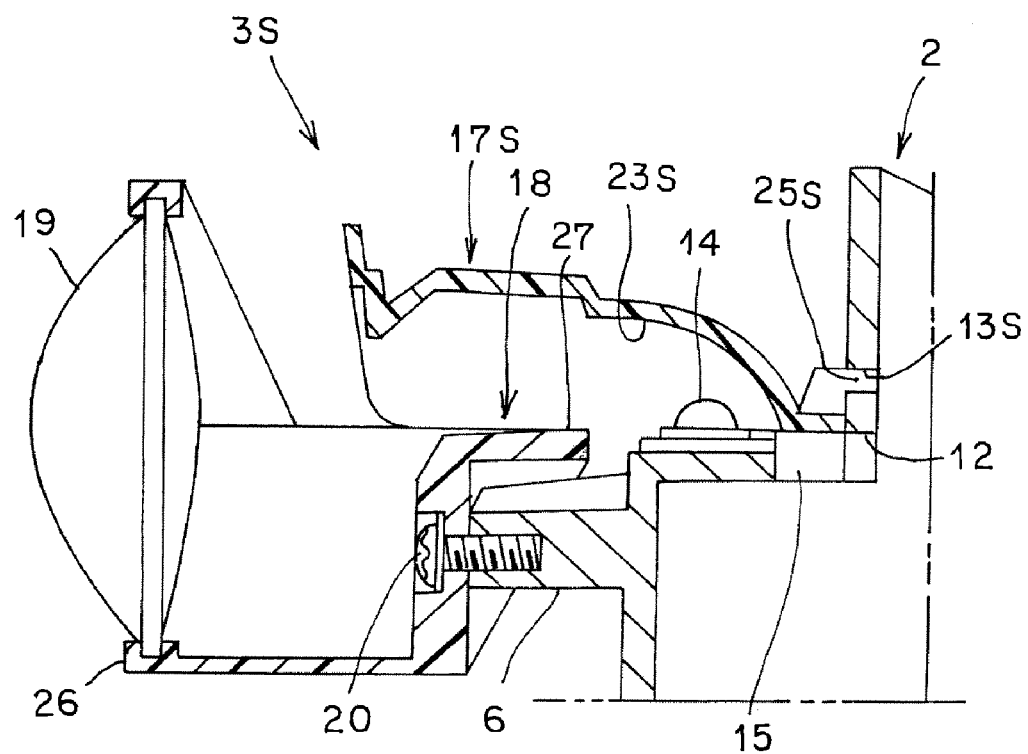
FIG. 10 is a partial longitudinal cross section (partial vertical cross section) showing a state in which the lamp units are mounted on the heat sink member.

A center O1 of the pivot portion 7; a center O2 of the vertical mounting portion 8 (center of screw mounting of optical axis adjustment mechanism for vertical direction); and a center O3 of the horizontal mount portion 9 (center of screw mounting of optical axis adjustment mechanism for horizontal direction), are positioned in locations of three corners of a triangle, respectively, as seen in the plan view of FIG. 7, as seen in the front view of FIG. 8, and further, as seen in the side view of the FIG. 9.

An opening 12 for inserting a connector (not shown) therethrough is provided at an upper vertical portion which is adjacent to the placement portion 5 of the heat sink member 2. At the left and right of the opening 12, recessed portions (or through holes) 13S, 13W serving as both of a guide portion, a temporary tacking portion, and a post-assembling proof portion are provided, respectively. The recessed portions 13S, 13W are formed in a rectangular shape, as seen in a front view, and are provided in one pair.

The two lamp units 3S, 3W, as shown in FIGS. 1, 2, 10, and 12, are made up of: a semiconductor-type light source 14; a power feed holder 15; a mount spring 16; reflectors 17S, 17W; a shade 18; projecting lenses (convex lens, focusing lens) 19; and a mount screw 20.

As the semiconductor-type light source 14, for example, a self-luminous semiconductor-type light source such as an LED or an EL (organic EL) (an LED in the embodiment) is used. The semiconductor-type light source 14 is made of: a board 21 as a thermally conductive insulation board (ceramics, for example); a light emitter (not shown) of a very small, rectangle-shaped (square-shaped) LED chip provided on one face (top face) of the board 21; and an optical transmission member (lens) 22 which is substantially shaped like a hemisphere (dome-shaped), the member covering the light emitter.

The other face (bottom face) of the board 21 of the semiconductor-type light source 14 is mounted on one face (top face) of the placement portion 5 of the heat sink member 2 in one direction (upward direction) by means of the power feed holder 15 and the mount spring 16.

The power feed holder 15 is intended to feed power to the semiconductor-type light source 14 by electrically connecting a harness (not shown), which is connected to a power source (not shown), via a connector (not shown). In other words, the connector is inserted into the opening 12, and is electrically connected to the power feed holder 15, thereby enabling power feeding to the semiconductor-type light source 14.

The mount spring 16 is fixed to the heat sink member 2, thereby mounting the power feed holder 15 and the semiconductor-type light source 14 on the heat sink member 2.

The reflectors 17S, 17W are made up of an optically opaque resin member or the like. The reflectors 17S, 17W each are formed in a shape in which they open in two directions (forward direction and downward direction) and are closed in four directions (backward direction, upward direction, leftward direction, rightward direction). On an interior face of the closed portion of the reflector 17S of focusing type, a reflecting surface 23S is provided for reflecting light (not shown) radiated from the light emitter of the semiconductor-type light source 14 in a predetermined direction in a predetermined focusing light distribution pattern (not shown). On the other hand, on an interior face of the closed portion of the reflector 17W of diffusion type, a reflecting surface (not shown) is provided for reflecting the light (not shown) radiated from the light emitter of the semiconductor-type light source 14 in a predetermined direction in a predetermined diffusive light distribution pattern (not shown).

Mount groove portions 24 are provided at both of the left and right sides of the front portions of the reflectors 17S, 17W, respectively. In addition, protrusive portions 25S, 25W, serving as a guide portion, a temporary tacking portion, and a post-assembling proof portion, are provided at both of the left and right sides at rear parts of the reflectors 17S, 17W, respectively. The protrusive portions 25S, 25W are provided in one pair and are formed in a laterally-viewed inverted-L shape protruding upward from the reflectors 17S, 17W, and protruding backward. A tip end of a respective one of the protrusive portions 25S, 25W is formed in a rectangular shape seen in a rear view.

Figure 11:
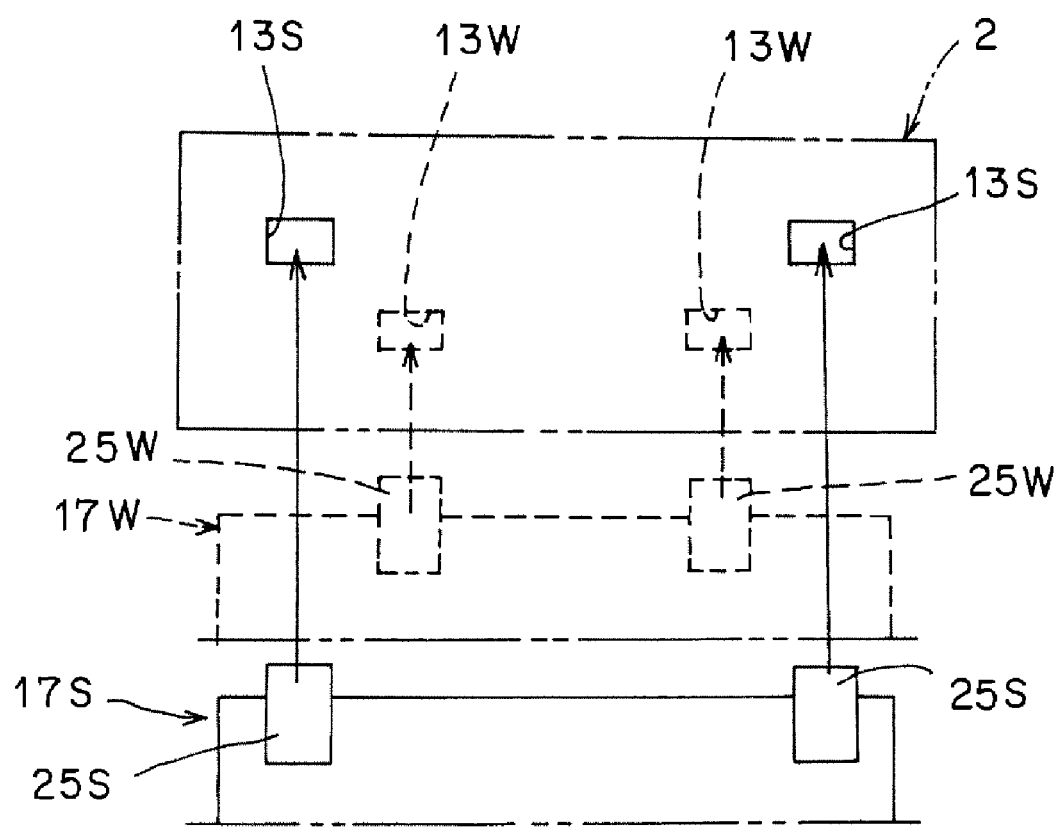
FIG. 11 is an explanatory view showing a guide portion, a temporary tacking portion, and a post-assembling proof portion, which are multi-functional and are provided at the heat sink member and the two lamp units.
Figure 12:
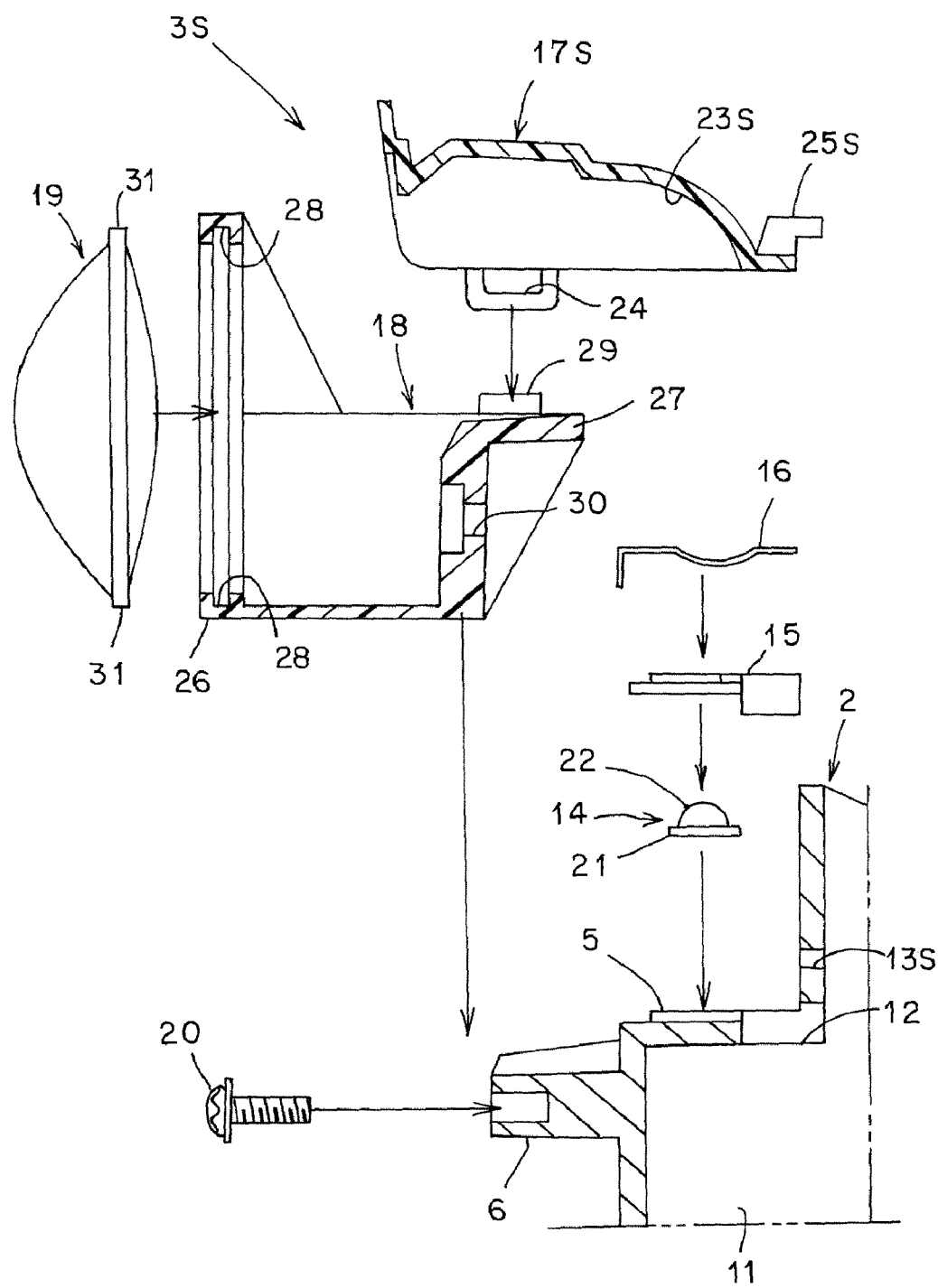
FIG. 12 is a partially exploded longitudinal cross section (partially exploded vertical cross section) showing the heat sink member and the lamp units.

The widths of the two recessed portions 13S and the two protrusive portions 25S for the lamp unit 3S of focusing type, which are drawn in the solid line of FIG. 11, are greater than those of the two recessed portions 13W and the two protrusive portions 25W for the lamp unit 3W of diffusion type, which are drawn in the dashed line of FIG. 11. The widths of the two recessed portions 13S, 13W and the two protrusive portions 25S, 25W, of FIG. 11, are shown to be greater or smaller than actual widths of the two recessed portions 13W, 13W and the two protrusive portions 25S, 25W, in order to clarify the sizes of the widths of the two recessed portions 13S, 13W and the two protrusive portions 25S, 25W.

The shade 18 is made up of an optically opaque resin member or the like. The shade 18 is made up of a front ring portion 26 and a rear shade portion 27 which are structured integrally with each other. Engagement groove portions 28 are provided at the top and bottom of the ring portions 26, respectively. Mount claw portions 29 are provided at both of the left and right sides of the shade portion 27, respectively. In addition, a through hole 30 for inserting the mount screw 20 therethrough is provided at a front part of the shade portion 27.

The claw portion 29 of the shade 18 is mounted on the mount groove portion 24 of a respective one of the reflectors 17S, 17W. The protrusive portions 25S, 25W of the reflectors 17S, 17W, having the shade 18 integrally mounted thereon, are engaged with the recessed portions 13S, 13W of the heat sink member 2. In this manner, a guide is provided for mounting of the reflectors 17S, 17W that are integrated with each other and the shade 18 on the heat sink member 2; temporary tacking is provided for the reflectors 17S, 17W that are integrated with each other and the heat sink member 2 of the shade 18; and further, the reflectors 17S, 17W, which are integrated with each other, and the shade 18 are precluded from being incorrectly assembled with the heat sink member 2.

The mount screw 20 is inserted into the through hole 30 of the shade 18 which is temporarily tacked with the heat sink member 2, and is then threaded into the mounting boss portion 6 of the heat sink member 2, whereby the reflectors 17S, 17W integrated with each other and the shade 18 are securely fixed to the heat sink member 2.

The projecting lens 19 is a non-spherical convex lens. A foreside (external side) of the projecting lens 19 is formed in the shape of a non-spherical convex face with its great curvature (with its small radius of curvature), whereas a backside (the side of the semiconductor-type light source 14) of the projecting lens 19 is formed in the shape of a non-spherical convex face with its small curvature (with its great radius of curvature). By using such projecting lens 19, a focal point distance of the projecting lens 19 is reduced, and dimensions in the optical axis direction of the projecting lens 19 in the vehicle lighting system 1 of the embodiment becomes compact, accordingly. The backside of the projecting lens 19 may also be formed in the shape of a non-spherical flat face (plane).

Engagement protrusive portions 31 are provided at the circumferential top and bottom of the projecting lens 19, respectively. The engagement protrusive portion 31 of the projecting lens 19 are engaged with the engagement groove portion 28 of the ring portion 26 of the shade 18 which is securely fixed to the heat sink member 2, whereby the projecting lens 19 is fixed to the shade 18 which is securely fixed to the heat sink member 2. In this manner, the lamp unit 3S of focusing type and the lamp unit 3W of diffusion type are mounted on the heat sink member 2, respectively.

The heat sink member 2 and the two lamp units 3S, 3W are disposed to be adjustable along an optical axis in a lamp room partitioned by the lamp housing 4 and the lamp lens, via: a pivot mechanism; and a pair of an optical axis adjustment mechanism for vertical direction (not shown) and an optical axis adjustment mechanism for horizontal direction (not shown).

Figure 5:
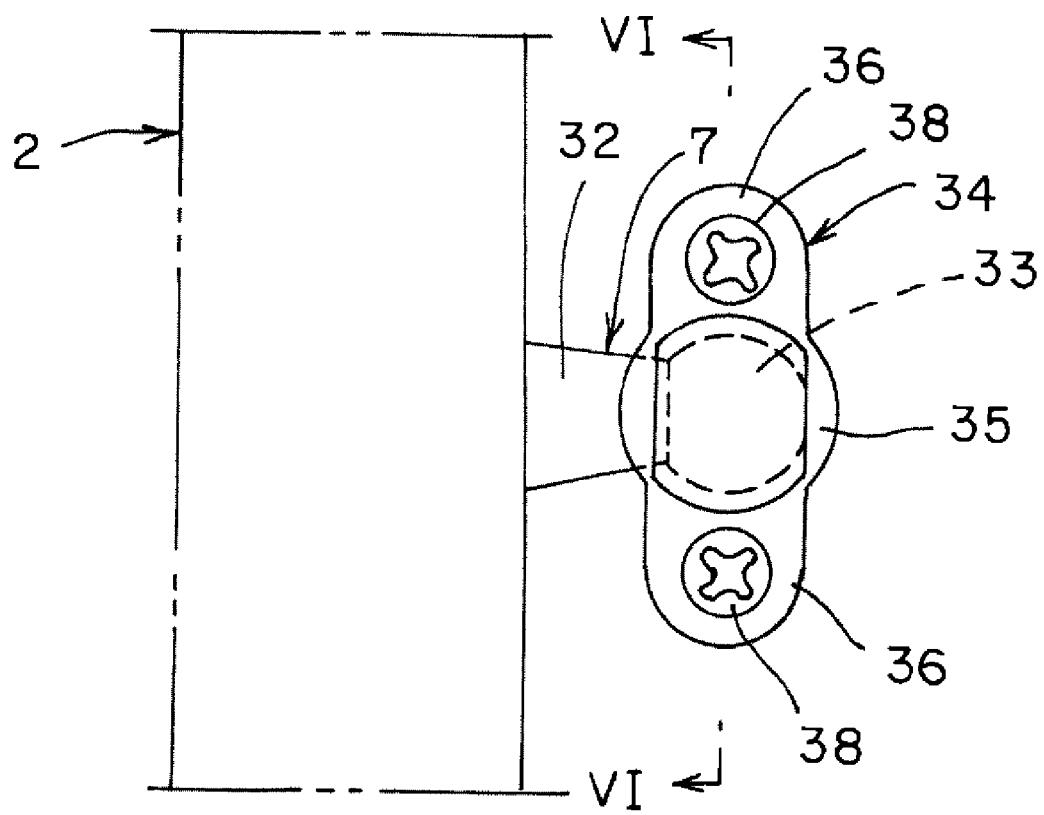
FIG. 5 is a partial explanatory view showing a state in which a pivot portion of the heat sink member is mounted on a lamp housing via a holder.
Figure 6:
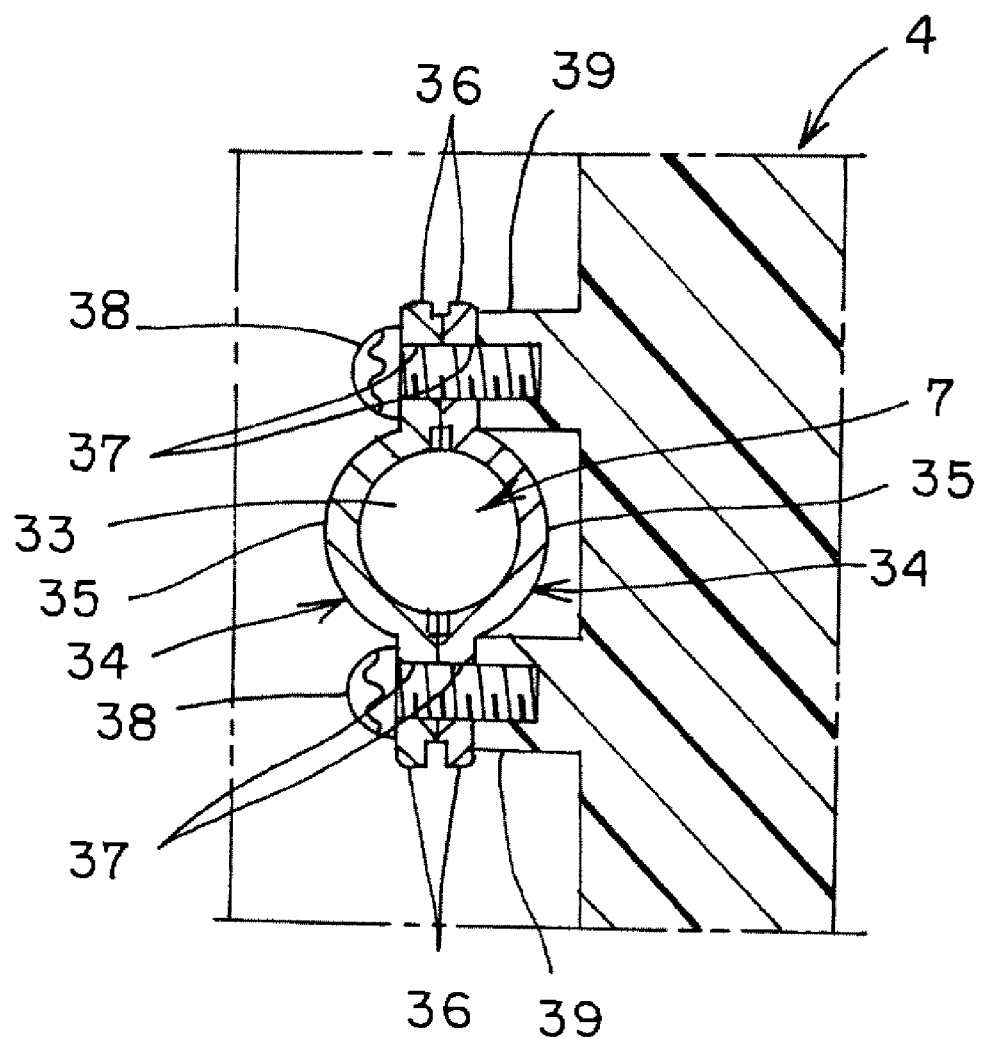
FIG. 6 is a sectional view taken along the line VI-VI of FIG. 5.

The pivot mechanism, as shown in FIGS. 5 and 6, is made of: the pivot portion 7; a holder (mount bracket) 34 for rotatably mounting the pivot portion 7 on the lamp housing 4; and a screw 39. The pivot portion 7 is made up of: a shaft portion 32 shaped like a truncated cone, integrally protruding from the heat sink member 2; and a spherical portion 33 which is integrally provided at the shaft portion 32. On the other hand, the holder 34 is made up of: a hemispherical recessed portion 35; and a mount piece portion 36, integrally protruding from the hemispherical recessed portion 35 in two directions. Circular through holes 37 are provided at the two mount piece portions 36, respectively. The hemispherical recessed portions 35 of the two holders 34 are sandwiched between both sides relative to the spherical portion 33 of the pivot portion 7. The screw 39 is inserted into the through hole 37 of the two holders 34 and is threaded into a boss portion 38 of the lamp housing 4. The pivot portion 7 is thereby rotatably mounted on the lamp housing 4 via the holder 34.

The optical axis adjustment mechanism for vertical direction and the optical axis adjustment mechanism for horizontal direction are made up of: an adjustment screw (not shown) which is mounted on the lamp housing 4 to enable rotation and disable advancement and retraction; and substantially spherical screw mounting, which is threaded into the adjustment screw and is rotatably mounted on a respective one of the vertical mount portion 8 and the horizontal mount portion 9 of the heat sink member 2. By rotating the adjustment screw, the screw mounting is screw-fed, and the heat sink member 2 and the two lamp units 3S, 3W are turned (rotated and/or inclined), respectively, in a horizontal direction around a vertical axis connecting a center O1 of the pivot portion 7 and a center O2 of the vertical mount portion 8 (the center of the screw mounting of the optical axis adjustment mechanism for vertical direction) with each other relative to the lamp housing 4 and in a vertical direction around a horizontal axis connecting the center O1 of the pivot portion 7 and a center O3 of the horizontal mount portion 9 (the center of the screw mounting of the optical axis adjustment mechanism for horizontal direction), and the optical axes of the two lamp units 3S, 3W are adjusted.

The vehicle lighting system 1 of the embodiment is made of the constituent elements described above, and hereinafter, functions of the constituent elements will be described.

First, the light emitters of semiconductor-type light sources 14 of a lamp unit 3S of focusing type and a lamp unit 3W of diffusion type is lit to emit light. Afterwards, the light radiated from the light emitter of the semiconductor-type light source 14 of the lamp unit 3S of focusing type is reflected on a reflecting surface 23S of a reflector 17S of focusing type in a predetermined direction in a predetermined focusing light distribution pattern, and the reflected light is illuminated to the outside. On the other hand, the light radiated from the light emitter of the semiconductor-type light source 14 of the lamp unit 3W of diffusion type is reflected on a reflecting surface of the reflector 17W of diffusion type in a predetermined direction in a predetermined diffusing light distribution pattern, and the reflected light is illuminated to the outside.

A heat generated when the semiconductor-type light source 14 is lit to emit light, is primarily radiated from a placement portion 5 of a heat sink member 2 via a foreside heat radiation fin 10 and a backside heat radiation fin 11. In addition, the aforementioned heat is primarily radiated via: a mounting boss portion 6 and a shade 18, of a heat sink member 2; protrusive portions 25S, 25W engaging with recessed portions 13S, 13W and reflectors 17S, 17W, of the heat sink member 2; a pivot portion 7, a holder 34, a screw 39, and a lamp housing 4, of the heat sink member 2; a vertical mount portion 8, an optical axis adjustment mechanism for vertical direction, and a lamp housing 4, of the heat sink member 2; and a horizontal mount portion 9, an optical axis adjustment mechanism for horizontal direction, and the lamp housing 4, of the heat sink member 2.

By rotating an adjustment screw of the optical axis adjustment mechanism for vertical direction, screw mounting of the optical axis adjustment mechanism for vertical direction is screw-fed; the heat sink member 2 and two lamp units 3S, 3W are turned (rotated and/or inclined) in a vertical direction around a horizontal axis connecting a center O1 of a pivot portion 7 and a center O3 of a horizontal mount portion 9 (the center of the screw mounting of the optical axis adjustment mechanism for horizontal direction) with each other relative to the lamp housing 4; and optical axes in the vertical direction of the two lamp units 3S, 3W are adjusted.

On the other hand, by rotating an adjustment screw of the optical adjustment mechanism for horizontal direction, screw mounting of the optical axis adjustment mechanism for horizontal direction is screw-fed; the heat sink member 2 and two lamp units 3S, 3W are turned (rotated and/or inclined) in a horizontal direction around a vertical axis connecting the center O1 of the pivot portion 7 and the center O2 of the vertical mount portion 8 (the center of the screw mounting of the optical axis adjustment mechanism for vertical direction) with each other relative to the lamp housing 4; and optical axes in the horizontal direction of the two lamp units 3S, 3W are adjusted.

The vehicle lighting system 1 of the embodiment is made of the constituent elements and their associated functions as described above, and hereinafter, advantageous effect(s) thereof will be described.

The vehicle lighting system 1 of the embodiment allows a heat radiation area to be increased by means of the pivot portion 7 for optical axis adjustment, the vertical mount portion (optical adjustment mechanism mounting portion for vertical direction) 8, and a horizontal mount portion (optical axis adjustment mechanism mounting portion for horizontal direction) 9, which are integrally provided on the heat sink member 2, so that a heat generated in the semiconductor-type light source 14 that is mounted on the heat sink member 2 can be efficiently radiated together with that of the heat sink member 2. In other words, heat radiation efficiency is improved.

Moreover, the vehicle lighting system 1 of the embodiment allows the pivot portion 7 for optical axis adjustment, to be mounted on the lamp housing 4 via a holder (pivot receptacle member) 34; and the optical axis adjustment mechanisms for vertical and horizontal directions, to be mounted, respectively, on the vertical mount portion (optical adjustment mechanism mounting portion for vertical direction) 8 and a horizontal mount portion (optical axis adjustment mechanism mounting portion for horizontal direction) 9 in a position relationship with the lamp housing 4. The optical axis of the semiconductor-type light source 14 can be thereby adjusted in the vertical and horizontal directions, via: the heat sink member 2; the pivot portion 7 for optical axis adjustment; the vertical mount portion (optical adjustment mechanism mounting portion for vertical direction) 8; and a horizontal mount portion (optical axis adjustment mechanism mounting portion for horizontal direction) 9, which are structured integrally with each other.

In addition, the vehicle lighting system 1 of the embodiment allows the pivot portion 7 to be positioned in proximity to a gravity in the forward/backward directions of a respective one of the heat sink member 2 and the portions 5, 6, 7, 8, 9, 10, 11; and the vertical mount portion 8 and the horizontal mount portion 9 to be positioned to be opposite to each other in the forward/backward directions with the pivot portion 7 being sandwiched therebetween, thus improving durability relative to a vehicle vibration. Moreover, the vehicle lighting system 1 of the embodiment allows the center O1 of the pivot portion 7; the center O2 of the vertical mount portion 8 (the center of the screw mounting of the optical axis adjustment mechanism for vertical direction; and the center O3 of the horizontal mount portion 9 (the center of the screw mounting of the optical axis adjustment mechanism for horizontal direction), to be positioned in three corners of a triangle, respectively, as seen in the plan view of FIG. 7, as seen in the front view of FIG. 8, and further, as seen in the side view of FIG. 9, respectively. Therefore, the durability relative to a vehicle vibration is further improved.

Further, the vehicle lighting system 1 of the embodiment allows the pivot portion 7 to be provided along a parting line PL of a die (not shown) for molding the heat sink member 2 and the portions 5, 6, 7, 8, 9, 10, 11; and the foreside heat radiation fin 10 and the backside heat radiation fin 11 to be integrally provided at the heat sink member 2 to be vertical (substantially vertical) to the parting line PL and in two directions, namely in the forward and backward directions. As a result, the vehicle lighting system 1 of the embodiment becomes capable of die-mounting the heat sink member 2 having the pivot portion 7 for optical axis adjustment; and the foreside and backside heat radiation fins 10 and 11 in two directions relative to the pivot portion 7 for optical axis adjustment, are integrally provided therein. Moreover, the vehicle lighting system 1 of the embodiment allows the pivot portion 7 for optical axis adjustment; and the foreside and backside heat radiation fins 10 and 11 in the two directions relative to the pivot portion 7 for optical axis adjustment, to be integrally provided at the heat sink member 2, thus further improving heat radiation efficiency.

In particular, the vehicle lighting system 1 of the embodiment allows two lamp units 3S, 3W to be easily mounted on the heat sink member 2, since the recessed portions 13S, 13W and the protrusive portions 25S, 25W as guide portions provided at the heat sink member 2 and the two lamp units 3S, 3W serve as guides for mounting the two lamp units 3S, 3W.

Moreover, the vehicle lighting system 1 of the embodiment allows the two lamp units 3S, 3W to be reliably mounted on the heat sink member 2, since the recessed portions 13S, 13W and the protrusive portions 25S, 25W, as temporary tacking portions provided at the heat sink member 2 and the two lamp units 3S, 3W, serve as temporary tacking until the two lamp units 3S, 3W are securely fixed to the heat sink member 2.

Furthermore, the vehicle lighting system 1 of the embodiment precludes the two lamp units 3S, 3W from being incorrectly assembled to the heat sink member 2, since the recessed portions 13S, 13W and the protrusive portions 25S, 25W, as incorrect assembling proof portions provided at the heat sink member 2 and the two lamp units 3S, 3W, preclude the lamp units from being incorrectly assembled at the time of mounting the two lamp units 3S, 3W on the heat sink member 2.

Still furthermore, the vehicle lighting system 1 of the embodiment allows the guide portion, the temporary tacking portion, and the post-assembling proof portion to be made of multifunctional recessed portions 13S, 13W and protrusive portions 25S, 25W, thus simplifying the relevant structure; and manufacturing cost can be reduced accordingly.

The foregoing embodiment described a vehicle lighting system such as a head lamp, whereas in the present invention, there may be any other vehicle lighting system such as a fog lamp, for example, as long as it works appropriately.

The foregoing embodiment described use of two lamp units of different types, namely those of focusing and diffusion types, 3S, 3W, whereas in the present invention, there may be use of one lamp unit or three or more lamp units.

Further, the foregoing embodiment described a case in which the widths of the two recessed portions 13S and two protrusive portions 25S of the lamp unit 3S of focusing type are greater than those of the two recessed portions 13W and two protrusive portions 25W of the lamp unit 3W of diffusion type. However, in the present invention, there may be a case of change of relative positions of two or three or more recessed portions and protrusive portions of a plurality of lamp units, respectively, and change of the shape of one recessed portion and one protrusive portion of the plurality of lamp units.

What is claimed is:

1. A vehicle lighting system which is disposed in a lamp room defined by a lamp housing and a lens, said system comprising:
   (i) a lamp unit including a semiconductor-type light source and reflectors arranged to reflect light from the semiconductor-type light source;
   (ii) a heat sink member having the lamp unit mounted on and separable from the heat sink member, for radiating a heat generated from the semiconductor-type light source;
   (iii) a pivot portion which is provided on a side face of the heat sink member, for rotatably mounting the heat sink member on the lamp housing, the pivot portion comprising a shaft portion extending from the heat sink member and a spherical portion provided at an end of the shaft portion; and
   (iv) an optical axis adjustment mechanism, which is provided at a predetermined position of a foreface of the heat sink member, the optical adjustment mechanism rotating via the pivot portion to thereby adjust an optical axis of light illuminated from the lamp unit, wherein:
   the pivot portion and the optical axis adjustment mechanism are formed integrally with each other relative to the heat sink member so as to improve heat radiation efficiency of the heat sink member,
   the optical axis adjustment mechanism includes:
      a first optical axis adjustment mechanism for adjusting the optical axis in a first direction; and
      a second optical axis adjustment mechanism for adjusting the optical axis in a second direction which is different from the first direction,
   wherein the pivot portion is positioned in proximity to a center of mass of the heat sink member in a forward direction, the first and second optical axis adjustment mechanisms are positioned opposite to each other in the forward direction with the pivot portion sandwiched between the first and second optical axis adjustment mechanisms.

2. The vehicle lighting system according to the claim 1, wherein:
   the pivot portion is provided along a parting line of a die for molding the heat sink member, the pivot portion, and the optical axis adjustment mechanism; and
   a heat radiation fin is provided normal to the parting line at the heat sink member.

3. The vehicle lighting system according to claim 1, wherein:
   the pivot portion, the first optical axis adjustment mechanism, and the second optical axis adjustment mechanism are formed integrally with each other relative to the heat sink member so as to be disposed at three corners forming a predetermined triangle of the heat sink member, in a case where the heat sink member is seen in a plan view, a front view, and a side view.

4. The vehicle lighting system according to claim 1, wherein:
   the first optical axis adjustment mechanism and the second optical axis adjustment mechanism are formed integrally with each other at the left and right of the foreface of the heat sink member in a case where the heat sink member is seen in a plan view.

5. The vehicle lighting system according to claim 1, wherein:

the pivot portion and the optical axis adjustment mechanisms are integrally molded with the heat sink member in a die for molding the heat sink member.

6. The vehicle lighting system according to claim 5, wherein:
the heat sink member includes:
a first heat radiation fin which is disposed at a foreside of the heat sink member; and
a second heat radiation fin which is disposed at a backside of the heat sink member, and
the first heat radiation fin and the second heat radiation fin are formed integrally with each other relative to the heat sink member together with the pivot portion and the optical axis adjustment mechanisms in the die for molding the heat sink member.

7. A vehicle lighting system which is disposed in a lamp room defined by a lamp housing and a lens, said system comprising:
(i) a lamp unit including a semiconductor-type light source and reflectors arranged to reflect light from the semiconductor-type light source;
(ii) a heat sink member having the lamp unit mounted on and separable from the heat sink member, for radiating a heat generated from the semiconductor-type light source;
(iii) a pivot portion which is provided on a side face of the heat sink member, for rotatably mounting the heat sink member on the lamp housing, the pivot portion comprising a shaft portion extending from the heat sink member and a spherical portion provided at an end of the shaft portion; and
(iv) an optical axis adjustment mechanism, which is provided at a predetermined position of a foreface of the heat sink member, the adjustment mechanism rotating via the pivot portion to thereby adjust an optical axis of light illuminated from the lamp unit, wherein:
the optical axis adjustment mechanism includes:
a first optical axis adjustment mechanism for adjusting the optical axis in a first direction; and
a second optical axis adjustment mechanism for adjusting the optical axis in a second direction which is different from the first direction, and the pivot portion, the first optical axis adjustment mechanism, and the second optical axis adjustment mechanism are formed integrally with each other relative to the heat sink member so as to be disposed at three corners forming a predetermined triangle of the heat sink member, in a case where the heat sink member is seen in a plan view, a front view, and a side view,
wherein the pivot portion is positioned in proximity to a center of mass of the heat sink member in a forward direction, the first and second optical axis adjustment mechanisms are positioned opposite to each other in the forward direction with the pivot portion sandwiched between the first and second optical axis adjustment mechanisms.

8. The vehicle lighting system according to claim 7, wherein:
the first optical axis adjustment mechanism and the second optical axis adjustment mechanism are formed integrally with each other at left and right locations of the foreface of the heat sink member in a case where the heat sink member is seen in a plan view.

9. The vehicle lighting system according to claim 7, wherein:
the pivot portion, the first optical axis adjustment mechanism, and the second optical axis adjustment mechanism are integrally molded with the heat sink member in a die for molding the heat sink member.

10. The vehicle lighting system according to claim 9, wherein:
the heat sink member includes:
a first heat radiation fin which is disposed at a foreside of the heat sink member; and
a second heat radiation fin which is disposed at a backside of the heat sink member, and
the first heat radiation fin and the second heat radiation fin are formed integrally with each other relative to the heat sink member together with the pivot portion and the optical axis
adjustment mechanisms in the die for molding the heat sink member.

* * * * *